United States Patent [19]
Forsyth

[11] 4,126,055
[45] Nov. 21, 1978

[54] TRANSMISSION REVERSE INTERLOCK
[75] Inventor: John R. Forsyth, Warren, Mich.
[73] Assignee: Chrysler Corporation, Highland Park, Mich.
[21] Appl. No.: 822,111
[22] Filed: Aug. 5, 1977
[51] Int. Cl.² .............................................. G05G 5/10
[52] U.S. Cl. ........................................ 74/476; 74/477
[58] Field of Search ................................ 74/476, 477

[56] References Cited
U.S. PATENT DOCUMENTS 3,292,442  12/1966  Ivanchich ........................ 74/477 X
3,319,476   5/1967  Iavelli et al. .................... 74/476 X
3,636,793   1/1972  Bieber ............................. 74/476 X Primary Examiner—Allan D. Hermann
Attorney, Agent, or Firm—Baldwin & Newtson

[57] ABSTRACT

An interlock for a manual transmission including a lever pivoted to a housing and movable between one position in which a slideable clutching member is held against axial movement when a reverse idler is engaged and a second position in which the reverse idler is held against axial movement when the slideable clutching member is in a first speed or second speed position.

10 Claims, 3 Drawing Figures

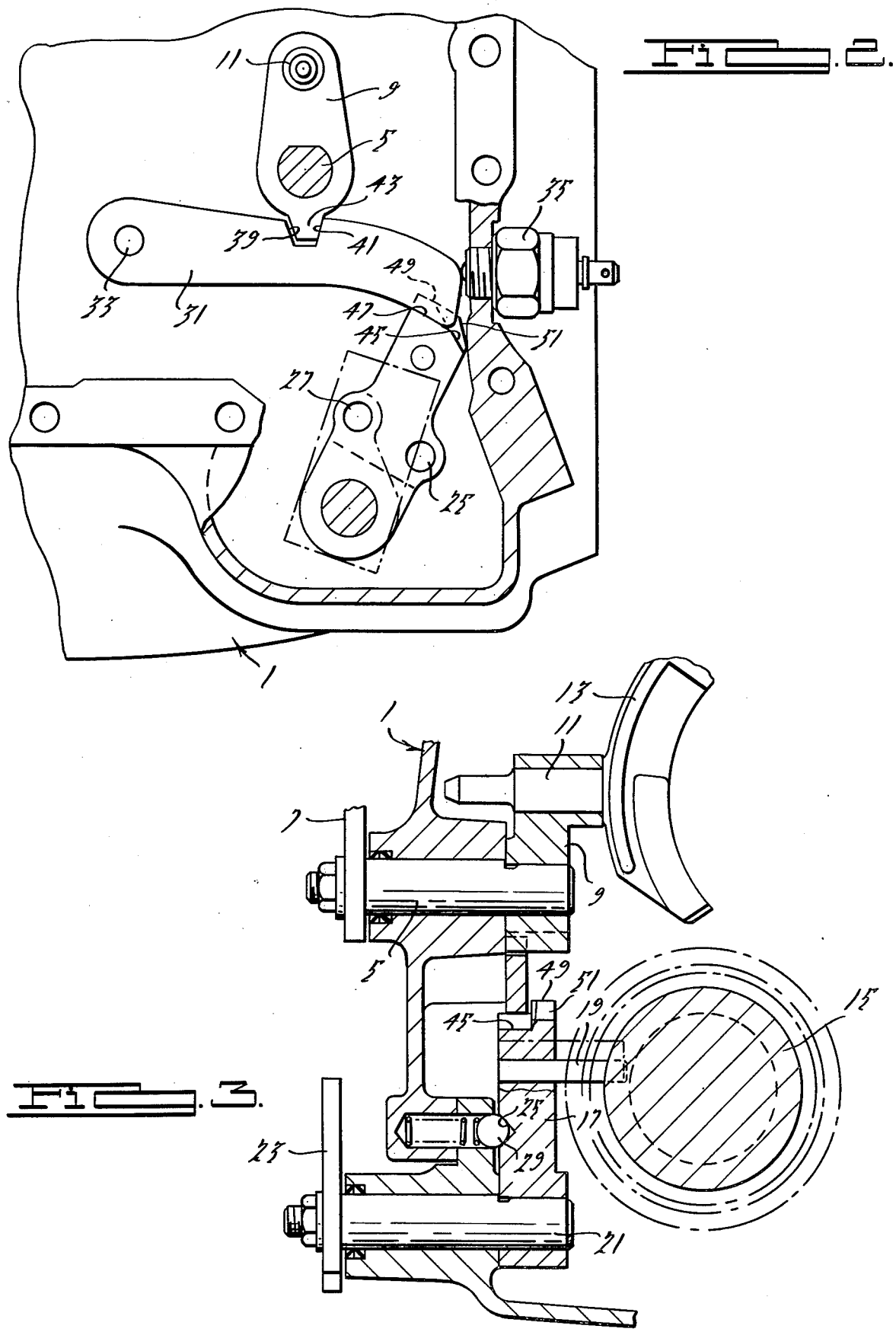

TRANSMISSION REVERSE INTERLOCK

BACKGROUND OF THE INVENTION

This invention relates to a multiple speed power transmission mechanism, and more particularly, to apparatus for preventing a simultaneous engagement of both a low forward speed gear and a reverse speed idler gear.

Generally, in manually operated transmissions having four or more forward speeds and a reverse gear the reverse-low speed sliding gear is usually required to perform an additional function of completing the drive train through the second forward speed gear in order to minimize the massiveness of the overall transmission assembly. This is accomplished by providing suitable shifting means for sliding the reverse-low speed sliding gear axially in one direction to one extreme position to effect a low forward speed operation and to axially slide the sliding gear in the opposite direction to the second extreme position to effect a second forward speed operation. Whenever the sliding gear would be in a neutral position, that is, generally intermediate the two extreme positions, it would then be available for engagement by an axially shiftable reverse speed idler gear mounted on a separate shaft for completing the drive in reverse. Various devices have been developed for preventing the simultaneous engagement of the gears forming the low and intermediate forward speed drive trains with the gears forming the reverse speed drive trains. For example, a rotatable blocking segment is shown in U.S. Pat. No. 3,319,479, the segment being adapted to move into a position which prevents movement of the low and intermediate speed selector mechanism when the reverse gears are in an operative condition. Other mechanisms such as shown in U.S. Pat. No. 3,292,442, utilize two cam portions which provide interference preventing the inadvertent movement of a lever to be shifted into a second speed ratio position. The present invention relates to an interlock mechanism for preventing the simultaneous engagement of the low forward speed gear and reverse speed gear.

BRIEF SUMMARY OF THE INVENTION

Briefly, this invention comprises a locking lever adapted to lock a sliding gear in an axially fixed position or a reverse idler gear out of a reverse drive position.

One of the primary objects of this invention is to provide an improved interlock mechanism for preventing the simultaneous engagement of the reverse gear drive train with the low and intermediate forward speed drive trains.

Another object of this invention is to provide an interlock mechanism of the class described wherein a slideable gear movable between one extreme position and another extreme position to effect different forward speed drive trains is locked into a central position when the reverse gear train is operative.

A further object of this invention is to provide an interlock mechanism such as described in which a locking lever is cammed into locking position when the reverse idler gear is moved to a position to effect engagement of the reverse gear train.

One of the primary objects of this invention is to provide an improved interlock mechanism for preventing the simultaneous engagement of the reverse gear drive train with the low and intermediate forward speed drive trains.

Another object of this invention is to provide an interlock mechanism of the class described wherein a slideable gear movable between one extreme position and another extreme position to effect different forward speed drive trains is locked into a central position when the reverse gear train is operative.

A further object of this invention is to provide an interlock mechanism such as described in which a locking lever is cammed into locking position when the reverse idler gear is moved to a position to effect engagement of the reverse gear train.

Another object of this invention is to provide an interlock such as described for causing the sliding gear which is locked in a neutral central position to be moved away from a second gear engaging position by the interlock during activation of the latter, thus preventing wear on certain rotating parts.

Still another object of the invention is to provide an interlock which is simple and economical in construction and efficient in operation.

Other objects and advantages of this invention will be made apparent as the description progresses.

BRIEF DESCRIPTION OF THE DRAWINGS

In the accompanying drawings in which one of various possible embodiments is illustrated.

FIG. 2 is similar to FIG. 1 showing certain parts in a different position; and

FIG. 3 is a section taken generally along lines 3—3 of FIG. 1 showing certain parts in a different position.

Like parts are indicated by a corresponding reference characters throughout the several views of the drawings.

DESCRIPTION OF THE PREFERRED EMBODIMENT

Figure 1:
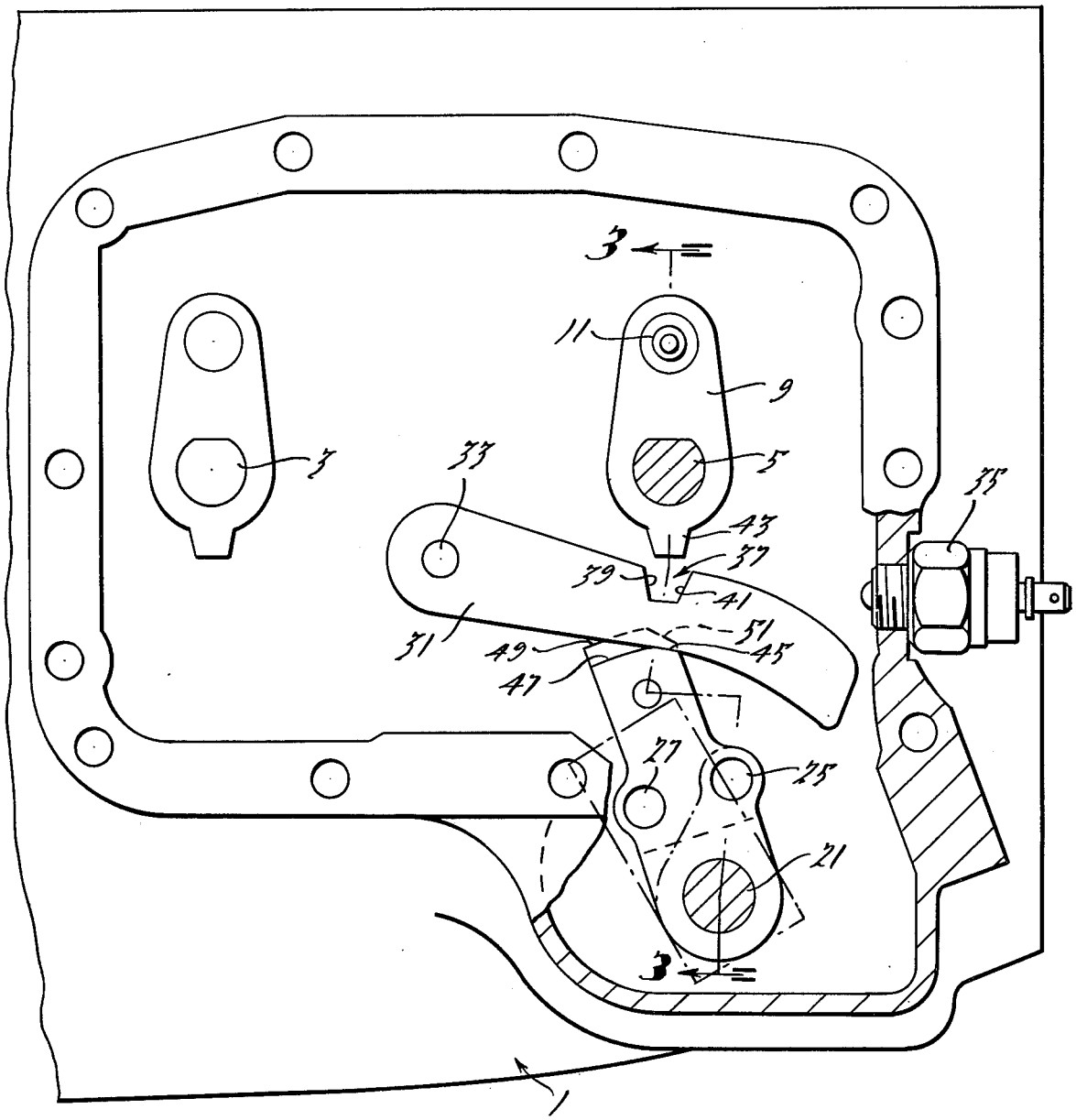
FIG. 1 is a fragmentary side elevation of a transmission having an interlock constructed in accordance with this invention, certain parts being broken away and removed for clarity.

Referring now to the drawings, a transmission housing is shown generally at 1. Rotatably mounted, in one side of such housing are rocker shafts 3 and 5, rocker shaft 3 being a 3rd and 4th gear ratio shaft and shaft 5 being a first and second gear ratio shaft.

This invention is related to the first and second gear ratio mechanisms and accordingly, only the apparatus relating to such mechanisms are shown in detail. Shaft 5 is adapted to be rotated by an arm 7 secured to the outer end thereof. A bell crank 9 is attached to the inner end of shaft 5 and at 11 rotatably supports a first and second speed shaft fork 13 at its outer end. As will be understood the arm 7 may be rotated by a manually operated link to rotate shaft 5 and bell crank 9, either clockwise or counterclockwise or viewed in FIG. 1 to move the fork 13 to the right or left of a central position. The fork engages a clutch sleeve (not shown) which when moved to the right relative to FIG. 1 will engage clutch teeth on a first speed gear and cause the first speed drive train to be effective. When the clutch sleeve is moved to the left relative to FIG. 1 it will engage clutch teeth on a second speed gear and cause the second speed drive train to be engaged. This operation is conventional and need not be explained in detail.

The clutch sleeve, as shown in U.S. Pat. No. 3,319,479, conventionally has external teeth which may be engaged by a movable reverse idler gear 15, for coupling a reverse gear train. Normally, the reverse idler gear 15 will be moved rearwardly, i.e., to the right with respect to FIG. 1, from a position out of engagement with the external teeth of the first and second clutch sleeve, into engagement with such teeth to effect engagement of a reverse gear drive train.

The means for moving the gear 15 from a non-driving position to a driving position includes an arm 17 carrying a pin 19 at its outer end engageable with a groove in the idler gear. Arm 17 is mounted on a shaft 21 journalled in the housing 1 and having an actuating arm 23 connected to its outer end. A suitable linkage (not shown) is connected to the arm 23 for rotating the same.

Arm 17 is provided with an inoperative detent or recess 25 and a reverse detent or recess 27 into which a spring biased ball 29 is urged when the arm 17 is in an inoperative or reverse position, respectively.

The locking mechanism includes an arm 31 pivotally supported at 33 on the inside of the housing 1 at a point between the rocker shafts 3 and 5. Arm 31 extends toward one end of the case and its free end is adapted to engage and actuate a reverse switch 35 for energizing an appropriate signal that the transmission is in a reverse gear mode.

Arm 31 has a notch or recess 37 therein the sides 39 and 41 of which are tapered outwardly from the bottom of the notch. The location of the notch 37 is such that when the arm is swung counterclockwise as viewed in FIG. 1 the notch will surround a ridge or tooth 43 depending from the lower end of bellcrank if the clutch sleeve controlled by the bellcrank is in a reverse position, i.e., the sleeve is located between the first and second forward speed gears. However, the location of the tapered side 41 is such that it will normally engage the mating edge of the ridge 43 as the arm 31 swings upwardly to cam the bellcrank clockwise slightly as viewed in FIG. 1. This causes the fork 13 to move the clutch sleeve slightly away from engagement with the synchronizing components for engaging the second speed gear. It has been found that when the components of the transmission are in a reverse drive condition, the clutch sleeve, which is rotating in a reverse direction, has a tendency to move toward the second gear, which is rotating in a forward direction. If the synchronizer ring (not shown) loaded by the sleeves onto the second speed gear cone, the differential speed between these oppositely rotating parts is quite large and an undue amount of wear would occur on the bronze synchronizer ring. The camming action referred to above prevents this surface contact.

If the bellcrank is in either a first forward speed or a second forward speed condition the notch 37 will not be aligned with the ridge 43, and accordingly, cannot be moved upwardly into a locking position.

The means for moving the lever upwardly into a locking position comprises an angled cam 45 formed on a stepped shoulder 47 located near the outer end of arm 17. The end face 49 of the arm 17 is cut at 51 on an angle for a purpose to be described.

When the clutch sleeve (not shown) is in a first forward speed position the bellcrank 9 will be pivoted clockwise about 30° from its FIG. 1 position so that ridge 43 prevents any substantial upward swinging movement of arm 31. Accordingly, an effort to move the arm 23 clockwise will be resisted and the movement of such arm 23 and arm 17 blocked by the engagement of cam 45 with the lower edge of the arm 31.

When the clutch sleeve (not shown) is in a neutral position, i.e., midway between he first and second forward speed gears, and it is desired to place the transmission in a reverse drive condition, the lever 23 will be rotated clockwise as viewed in FIG. 1, thereby causing the reverse idler to be moved from a disengaged position to an engaged position, i.e., in engagement with the external teeth on the clutch sleeve and a reverse gear on a countershaft, such as shown in aforementioned U.S. Pat. No. 3,319,479. As noted in such patent, if the shifting of the reverse idler gear into engagement with the reverse gear is accomplished with sufficient force or at a relatively high velocity and if the gear teeth edges of the idler and clutch sleeve abut it becomes apparent the clutch sleeve would, but for suitable interlocking apparatus, be urged toward engagement with the first speed gear clutch teeth, with the result being either a first forward speed drive condition being inadvertently attained, or both the first forward speed and reverse drive trains being engaged, thus locking the transmission. However, with the present apparatus, the lever 31 is cammed counterclockwise by cam 45 as the lever 23 is pivoted clockwise, as viewed in FIG. 1. The notch 37 surrounds ridge 43, with tapered side 41 forcing the bellcrank slightly clockwise to force the clutch sleeve away from the second speed gear as described above.

The outer end of lever 31 actuates switch 35 when the lever is in full locking engagement with the ridge 43. At the same time the angled surface 51 engages the inner side of the housing wall, which acts as a stop. When the bellcrank 9 is locked in its central position the clutch sleeve cannot be moved to either a first forward speed or second forward speed engagement position.

It will thus be seen that this apparatus provides a simple and economical means for preventing simultaneous engagement of both forward and reverse gear trains in a transmission.

In view of the foregoing, it will be seen that the several objects and other advantages of this invention are achieved.

Although only one embodiment of the invention has been disclosed and described, it is apparent that other embodiments and modifications of the invention are possible.

I claim:

1. A control mechanism for a multiple speed transmission of the type having a housing with first and second speed gears therein selectively coupled to an output shaft by a slideable member located therebetween, the slideable member adapted when in a neutral position between said gears to be engaged by a movable reverse idler gear to provide reverse drive, said control mechanism comprising a slideable member actuating member for moving said slideable member into coupling engagement with said first and second speed gears, a locking member pivotally mounted on said housing, a reverse idler actuating member for moving said reverse idler gear into engagement and disengagement relation with said slideable member actuating member, said locking member being movable between a locking position in which said slideable member actuating member is engaged thereby and locked against substantial movement and a blocking position in which said reverse actuating member is blocked against movement into a position in which said reverse idler gear is engaged with said slideable member, and cam means on said reverse idler actuating member engaging said locking member and adapted to move said locking member to locking position when said reverse idler gear is moved into engagement with said slideable member and the latter is in said neutral position, said reverse idler actuating member being blocked by said locking member against movement towards a position in which said reverse idler gear is in engagement with said slideable member when said slideable member is coupled to either said first or second gear.

2. A control mechanism as set forth in claim 1 wherein said locking member has a notch therein, said slideable member actuating member having a ridge depending therefrom adopted to be aligned for a substantially mating relationship with said notch when said slideable member is in said neutral position and said locking member is pivoted into locking position.

3. A control mechanism as set forth in claim 2 wherein said reverse idler actuating member wherein said cam means comprises a first surface adapted to engage the locking member when said reverse idler gear is engaged with said slideable member and a second surface for engaging said locking member when said reverse idler gear is not in engagement with said slideable member.

4. A control mechanism as set forth in claim 3 wherein said idler gear actuating member further includes shoulder adjacent said first and second surfaces, a stop surface cut into said shoulder for engaging said housing when said idler gear is moved into engagement with said slideable gear.

5. A control mechanism as set forth in claim 4 wherein the sides of said notch taper outwardly from the bottom thereof, the sides of said ridge tapering from the other end thereof outwardly toward the base thereof, the relative positions of said notch and recess being such that when said slideable member actuating member is in its neutral position, movement of said lever into locking position causes one side of said notch to slightly engage one side of said ridge and cam the slideable member actuating member slightly in one direction.

6. A control mechanism for a multiple speed transmission of the type having a housing with a first and second speed gears therein selectively coupled to an output shaft by a slideable member located therebetween, the slideable member adapted when in a neutral position between said gears to be engaged by a movable reverse idler gear to provide reverse drive, said control mechanism comprising slideable member actuating member for moving said slideable member into coupling engagement with said first and second speed gears, a locking member pivotally mounted on said housing, said slideable member actuating member having first locking means thereon, a reverse idler actuating member for moving said reverse idler gear into engagement and disengagement relation with said slideable member, said locking member having second locking means thereon being movable between a locking position in which said locking means mate to lock said slideable member actuating member against substantial movement and a blocking position in which said reverse actuating member is blocked against movement into a position in which said reverse idler gear is engaged with said slideable member, and cam means on said reverse idler actuating member engaging said locking member and adapted to move said locking member to locking position when said reverse idler gear is moved into engagement with said slideable member and the latter is in said neutral position said reverse idler actuating member being blocked by said locking member against movement towards a position in which said reverse idler gear is in engagement with said slideable member when said slideable member is coupled to either said first or second gear.

7. A control mechanism as set forth in claim 6 wherein said first locking means comprises a ridge on said slideable member actuating member, said second locking means comprising a recess in said locking member.

8. A control mechanism as set forth in claim 7 wherein said reversee idler actuating member wherein said cam means comprises a first surface adapted to engage the locking member when said reverse idler gear is engaged with said slideable member and a second surface for engaging said locking member when said reverse idler gear is not in engagement with said slideable member.

9. A control mechanism as set forth in claim 8 wherein said idler gear actuating member further includes shoulder adjacent said first and second surfaces, a stop surface cut into said shoulder for engaging said housing when said idler gear is moved into engagement with said slideable gear.

10. A control mechanism as set forth in claim 9 wherein the sides of said notch taper outwardly from the bottom thereof, the sides of said ridge tapering from the other end thereof outwardly toward the base thereof, the relative positions of said notch and recess being such that when said slideable member actuating member is in its neutral position, movement of said lever into locking position causes one side of said notch to slightly engage one side of said ridge and cam the slideable member actuating member slightly in one direction.

* * * * *